United States Patent
Lintilhac et al.

(10) Patent No.: US 10,805,294 B1
(45) Date of Patent: *Oct. 13, 2020

(54) SYSTEMS AND METHODS FOR VALIDATING DEVICE PERMISSIONS OF COMPUTING DEVICES TO EXECUTE CODE ON A DECENTRALIZED DATABASE

(71) Applicant: Trace, LLC, Burlington, VT (US)

(72) Inventors: Paul Lintilhac, Springfield, VT (US); Joshua Decatur, South Hero, VT (US); Paul Oostenrijk, De Rips (NL); Laura Seach, Brooklyn, NY (US)

(73) Assignee: Trace, LLC, Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,993

(22) Filed: Aug. 5, 2019

Related U.S. Application Data

(63) Continuation of application No. 16/362,394, filed on Mar. 22, 2019, now Pat. No. 10,412,086.

(51) Int. Cl.
| | |
|---|---|
| *H04L 29/06* | (2006.01) |
| *G06F 16/903* | (2019.01) |
| *G06F 16/13* | (2019.01) |
| *G06F 16/901* | (2019.01) |
| *G06F 21/62* | (2013.01) |

(52) U.S. Cl.
CPC ........ *H04L 63/0876* (2013.01); *G06F 16/134* (2019.01); *G06F 16/9017* (2019.01); *G06F 16/9024* (2019.01); *G06F 16/90335* (2019.01); *G06F 21/6218* (2013.01); *H04L 63/101* (2013.01)

(58) Field of Classification Search
CPC .................................................. H04L 63/0876
See application file for complete search history.

(56) References Cited

U.S. PATENT DOCUMENTS

| | | | | |
|---|---|---|---|---|
| 8,032,397 B2 * | 10/2011 | Lawless | ................ | G06Q 40/08 705/3 |
| 10,176,481 B2 | 1/2019 | Aljawhari | | |
| 10,325,428 B1 | 6/2019 | Kurian | | |
| 10,412,086 B1 | 9/2019 | Lintilhac | | |
| 10,454,918 B1 | 10/2019 | Uhr | | |
| 2005/0144132 A1 | 6/2005 | Lin | | |

(Continued)

OTHER PUBLICATIONS

Nizamuddin et al., "Decentralized Document Version Control using Ethereum Blockchain and IPFS", Computers & Electrical Engineering, Mar. 2019, 20 pages.

*Primary Examiner* — Shawnchoy Rahman
(74) *Attorney, Agent, or Firm* — Esplin & Associates, PC

(57) ABSTRACT

Systems and methods for validating device permissions of computing devices to execute code on a decentralized database are disclosed. Exemplary implementations may: store, on the decentralized database, a first set of code executable by the decentralized database, the first set of code being configured to instantiate objects; and store on the decentralized database, a second set of code executable by the decentralized database, the second set of code defining functions, the functions including receiving requests from computing devices, validating whether the requesting computing devices are permitted to make the requests, modifying the state of instantiated objects in accordance with the received requests, and/or other functions.

18 Claims, 6 Drawing Sheets

(56) References Cited

U.S. PATENT DOCUMENTS

| | | |
|---|---|---|
| 2016/0321677 A1 | 11/2016 | Dobaj |
| 2017/0027977 A1 | 2/2017 | Bahjat |
| 2017/0243215 A1 | 8/2017 | Sifford |
| 2017/0257358 A1* | 9/2017 | Ebrahimi ............... H04L 63/083 |
| 2018/0260212 A1* | 9/2018 | Wisnovsky ........... H04L 9/3236 |
| 2018/0337781 A1 | 11/2018 | Frankel |
| 2019/0019180 A1 | 1/2019 | Coburn |
| 2019/0050855 A1* | 2/2019 | Martino ................ H04L 9/0643 |
| 2019/0087598 A1 | 3/2019 | Adkins |
| 2019/0205894 A1* | 7/2019 | Gonzales, Jr. ...... G06F 16/1805 |
| 2019/0266145 A1 | 8/2019 | Qiu |
| 2019/0288850 A1 | 9/2019 | Beecham |
| 2019/0356609 A1 | 11/2019 | Grunwald |

* cited by examiner

SYSTEMS AND METHODS FOR VALIDATING DEVICE PERMISSIONS OF COMPUTING DEVICES TO EXECUTE CODE ON A DECENTRALIZED DATABASE

FIELD OF THE DISCLOSURE

The present disclosure relates to systems and methods for validating device permissions of computing devices to execute code on a decentralized database.

BACKGROUND

Validating whether particular users have permission to access a computer system is known. Validating whether particular users have permission to access a software object such as a user account is known.

SUMMARY

One aspect of the present disclosure relates to a system configured for validating device permissions of computing devices to execute code on a decentralized database. The system may include one or more hardware processors configured by machine-readable instructions. The processor(s) may be configured to store, on the decentralized database, a first set of code executable by the decentralized database. The first set of code may be configured to instantiate a first object having a first state and a second object having a second state. The first state may include a first list of device addresses of computing devices that are permitted to request modification of the first state. The second state may include a second list of device addresses of computing devices that are permitted to request modification of the second state. The processor(s) may be configured to store on the decentralized database, a second set of code executable by the decentralized database. The second set of code may define functions. The functions may be configured to receive a first request from a first computing device to modify the first state. The functions may be configured to validate, responsive to the first request, whether a first device address of the first computing device is included in the first list. The functions may be configured to modify, responsive to the first device address being included in the first list, the first state in accordance with the first request. The functions may be configured to receive a second request from a second computing device to modify the second state. The functions may be configured to validate, responsive to the second request, whether a second device address of the second computing device is included in the second list. The functions may be configured to maintain, responsive to the second device address not being included in the second list, the second state without modification by denying the second request.

Another aspect of the present disclosure relates to a method for validating device permissions of computing devices to execute code on a decentralized database. The method may include storing, on the decentralized database, a first set of code executable by the decentralized database. The first set of code may be configured to instantiate a first object having a first state and a second object having a second state. The first state may include a first list of device addresses of computing devices that are permitted to request modification of the first state. The second state may include a second list of device addresses of computing devices that are permitted to request modification of the second state. The method may include storing, on the decentralized database, a second set of code executable by the decentralized database. The second set of code may define functions. The functions may be configured to receive a first request from a first computing device to modify the first state. The functions may be configured to validate, responsive to the first request, whether a first device address of the first computing device is included in the first list. The functions may be configured to modify, responsive to the first device address being included in the first list, the first state in accordance with the first request. The functions may be configured to receive a second request from a second computing device to modify the second state. The functions may be configured to validate responsive to the second request, whether a second device address of the second computing device is included in the second list. The functions may be configured to maintain, responsive to the second device address not being included in the second list, the second state without modification by denying the second request.

As used herein, any association (or elation, or reflection, or indication, or correspondency) involving servers, processors, client computing platforms, computing devices, databases, instantiated objects, states of objects, lists of device addresses, permissions, modifications, verifications, validations, functions, requests, digital signatures, custody, and/or another entity or object that interacts with any part of the system and/or plays a part in the operation of the system, may be a one-to-one association a one-to-many association a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
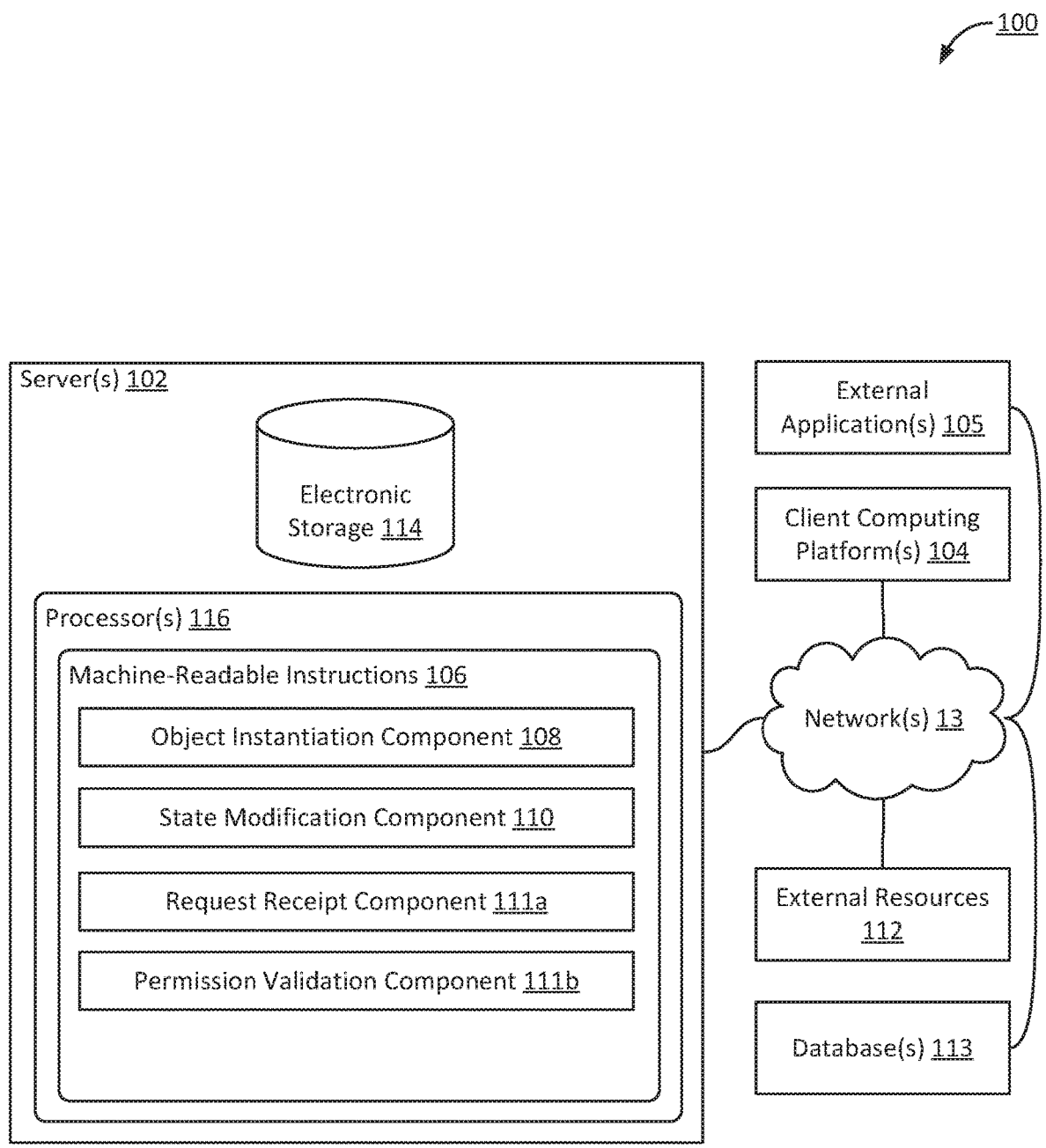
FIG. 1 illustrates a system configured for validating device permissions of computing devices to execute code on a decentralized database, in accordance with one or more implementations.

FIG. 1 illustrates a system 100 configured for validating device permissions of computing devices to execute code on one or more databases 113, in accordance with one or more implementations. In some implementations, databases 113 may include one or more decentralized databases. Databases 113 may be configured to facilitate sharing information among users in different physical locations, using different computing devices and/or platforms. Decentralized databases may be configured to facilitate sharing control and/or hosting responsibilities of shared information among multiple users, e.g., to prevent a single point of failure.

Ledgers may produce a secure record or registry of ownership of assets, transactions, and other information. A database may include a ledger, and a ledger may be implemented as a database. For example, a blockchain is a type of ledger, as well as a type of decentralized database that stores a registry of assets and transactions. Blockchain technology may be used for cryptocurrencies, smart contracts, and/or other applications for a decentralized database. In some implementations, database 113 may include and/or implement a blockchain. In some implementations, database 113 may be configured to store a registry of assets, transactions, and/or other information.

In some implementations, system 100 may include one or more servers 102, one or more client computing platforms 104, one or more databases 113, external resources 112, one or more external applications 105, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures.

Users may access system 100 via client computing platform(s) 104. The users may include a first user, a second user, a third user, a fourth user, and so forth. Client computing platforms 104 may include a first client computing platform, a second client computing platform, a third client computing platform a fourth client computing platform and so forth. The first client computing platform may be associated with the first user, and/or vice versa. The second client computing platform may be associated with the second user, and/or vice versa. The third client computing platform may be associated with the third user, and/or vice versa. The fourth client computing platform may be associated with the fourth user, and/or vice versa, and so forth. Numbering users, client computing platforms, requests, and/or any other entity, action, or object that interacts with any part of system 100 and/or plays a part in the operation of system 100 merely serves to distinguish different entities, actions, or objects, and does not imply an ordering or hierarchy unless expressly stated. In some implementations, the first user may access and/or otherwise use a first local version of database 113 on the first client computing platform, the second user may access and/or otherwise use a second local version of database 113 on the second client computing platform, and so forth. Different versions of the same database do not need to be identical. In some implementations, for example, the first version of database 113 may include proprietary and/or otherwise privileged information that is not accessible to the second user. In some implementations a particular user may be associated with multiple client computing platforms 104. In some implementations, an individual client computing platform 104 (e.g., a computing device) may be associated with exactly one user.

Figure 3A:
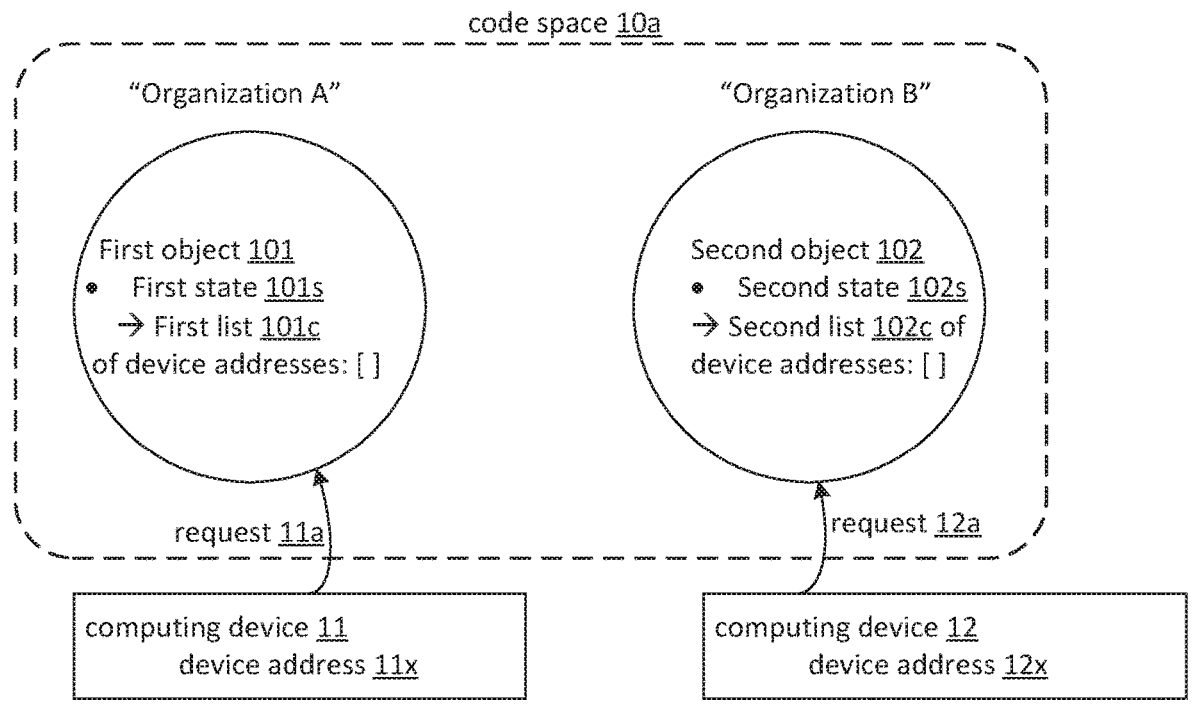
FIGS. 3A-3B, 4A-4B, and 5A-5B illustrate exemplary code spaces interacting with one or more computing devices, in accordance with one or more implementations of a system that validates device permissions for computing devices executing code and/or functions on a decentralized database.

In some implementations, individual client computing platforms 104 may be identified by individual identifiers. In some implementations, a device identifier may be a device address. For example, a first computing device 11 (as shown in FIG. 3A) may be identified by a first device identifier such as a first device address $11x$. A second computing device 12 (as shown in FIG. 3A) may be identified by a second device identifier such as a second device address $12x$. A third computing device may be identified by a third device identifier, a fourth computing device may be identified by a fourth device identifier, and so forth. Referring to FIG. 1, in some implementations, individual client computing platforms 104 may be associated with one or more cryptographic keys. For example, a particular computing device may be associated with a key pair of cryptographic keys that includes a public cryptographic key and a private cryptographic key to facilitate public-private key encryption and decryption. In some implementations, a particular device identifier and/or a particular device address may be based on and/or created by one or more cryptographic keys of a particular key pair. For example, first device address $11x$ (shown in FIG. 3A) may be based on and/or the same as a first public decryption key that forms a key pair with a first private encryption key (which may be stored securely on first computing device 11). For example, second device address $12x$ (shown in FIG. 3A) may be based on and/or the same as a second public decryption key that forms a key pair with a second private encryption key (which may be stored securely on second computing device 12).

Referring to FIG. 1, in some implementations, database 113 (e.g., a blockchain or another structure of recorded transactions and/or blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smartcontracts. In some implementations, objects in the runtime environment may be considered as existing in a code space. For example, deploying and/or instantiating a new object may be interpreted as adding the new object to the code space. In some implementations, a change to a particular object in the runtime environment may be interpreted as a change in the code space, e.g., a change to the state of the particular object. In some implementations, the distributed computing platform may include electronic storage configured to store part or all of database 113. For example, smart contracts may be stored on database 113. In some implementations, the distributed computing platform may be the EOSIO platform. In some implementations, the distributed computing platform may be Ethereum. In some implementations the virtual machine may be a Turing-complete and decentralized virtual machine.

Database 113 may store a registry of assets and transactions across one or more networks 13, including but not limited to the Internet and/or other networks. Assets may be owned by users. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform e.g., in the operation of database 113.

In some implementations, database 113 may record ownership of assets. Alternatively, and/or simultaneously, database 113 may record transactions that modify ownership of assets. A smart contract may be a type of asset. In some implementations, once a smart contract has been added to database 113, the smart contract may be referred to as published, posted, and/or recorded. In some implementations, elements of database 113 may be grouped together in units that are referred to as blocks. Individual blocks may be linked or chained together to form a structure of blocks and/or a hierarchy of blocks, such as, e.g., a chain of blocks. An individual block may include one or more assets and one or more transactions. In some implementations, elements of database 113 may be linked together in a manner that prevents tampering such as, e.g., a hash chain. Individual elements and/or transactions may be linked or chained together to form a structure and/or a hierarchy of elements and/or transactions.

In some implementations, database 113 may be publicly accessible and append-only. In some implementations, existing blocks of database 113 can substantially not be altered or deleted, unless multiple copies of the database are altered. This is unlikely to happen provided that multiple copies and/or versions of the database are stored on different computing platforms, e.g., in different geographical locations. In some implementations, database 113 may be replicated on multiple computing platforms, preferably in multiple different geographical locations. As used herein, the term "distributed" refers to multiple computing platforms located in multiple separate and distinct geographical locations operating together to provide particular functionality, such as, e.g., in the case of a particular distributed database, the functionality of a blockchain.

Server(s) 102 may be configured by machine-readable instructions 106. Machine-readable instructions 106 may include one or more instruction components. The instruction components may include computer program components. The instruction components may include one or more of object instantiation component 108, state modification component 110, request receipt component 111a, permission validation component 111b, and/or other instruction components.

Object instantiation component 108 may be configured to store, on database 113, code executable by database 113. By way of non-limiting example, a first set of code may be executable by a blockchain. The first set of code may be configured to instantiate and/or deploy objects. In some implementations, the first set of code may be configured to instantiate and/or deploy objects in one or more of database 113, a blockchain included in and/or implemented by database 113, a distributed computing platform maintained by a blockchain, a runtime environment for smart contracts and other applications on a blockchain, and/or a code space. In some implementations, individual instantiated objects may be identified by individual object identifiers. In some implementations, instantiated objects may include multiple classes of different types of objects. In some implementations, instantiated objects may have different types. In some implementations, a particular type of instantiated object may be an organization object, as described elsewhere in this disclosure. In some implementations, a particular type of object may be an organization-controlled asset object, as described elsewhere in this disclosure. By way of non-limiting example instantiated objects may include a first object, a second object, a third object, etc, a first organization object, a second organization object, a third organization object, etc., a first organization-controlled asset object, a second organization-controlled asset object, a third organization-controlled asset object, etc.

In some implementations, instantiated objects may have state, including but not limited to the values of constants, variables, data structures, and/or other information associated with the objects. The state of objects may include permanent information that cannot be modified by users and non-permanent information that can be modified by (at least some of the) users. For example, a first object may have a first state, a second object may have a second state a third object may have a third state, and so forth. In some implementations, the state for different types of objects may include different types of information. The state of individual objects may include individual object identifiers. The state of objects may include and/or refer to a list of device identifiers, device addresses, object identifiers, and/or other identifiers that list and/or identify computing devices and/or objects that are permitted to take certain actions, including but not limited to modifying states of objects. For example, the first organization-object state of a first organization object may include a list of device addresses that identify computing devices that are permitted to make certain modifications to the first organization-object state. For example, the second organization-object state of a second organization object may include a list of device addresses that identify computing devices that are permitted to make certain modifications to the second organization-object state, and so forth. For example, the first organization-controlled asset object state of a first organization-controlled asset object may include a reference to a list of device addresses that identify computing devices that are permitted to make certain modifications to the first organization-controlled asset object state. For example, the second organization-controlled asset object state of a second organization-controlled asset object may include a reference (e.g., a link) to a list of device addresses that identify computing devices that are permitted to make certain modifications to the second organization-controlled asset object state, and so forth. In some preferred embodiments, such a reference may be an object identifier, such as an organization object identifier that identifies an organization object. For example, the reference included in the second organization-controlled asset object state may refer to the first organization object identifier, such that a change in the list of permitted devices for the first organization object may imply the same change in the set of computing devices that are permitted to make certain modifications to the first organization-controlled asset object state.

By way of non-limiting example, FIG. 3A illustrates an exemplary code space 10a interacting with one or more computing devices, in accordance with one or more implementations of system 100. As depicted, code space 10a interacts with (first) computing device 11 that is identified by (first) device address 11x and (second) computing device 12 that is identified by (second) device address 12x. Computing device 11 may interact with code space 10a by a first request 11a to instantiate and/or deploy an object, in particular an organization object. First request 11a may effectuate, through the executable code stored by object instantiation component 108, the instantiation and/or deployment of first object 101. First object 101 may by identified by an object identifier, here depicted as a label "Organization A". First object 101 may have a first state 101s (e.g., an organization-object state). First state 101s may include different types of information, including but not limited to a first list 101c of device addresses of computing devices that are permitted to take certain actions affecting first object 101, such as modifying first state 101s, and/or other actions. A list such as list 101c may be referred to as a permitted device list. Computing device 12 may interact with code space 10a by a second request 12a to instantiate and/or deploy an object, in particular an organization object. Second request 12a may effectuate, through the executable code stored by object instantiation component 108, the instantiation and/or deployment of second object 102. Second object 102 may by identified by an object identifier, here depicted as a label "Organization B". Second object 102 may have a second state 102s (e.g., an organization-object state). Second state 102 may include different types of information including but not limited to a second list 102c of device addresses of computing devices that are permitted to take certain actions affecting second object 102, such as modifying second state 102s, and/or other actions. A list such as list 102c may be referred to as a permitted device list. Prior to completion of first request 11a and second request 12a, first list 101c and second list 102c may be empty.

Figure 3B:
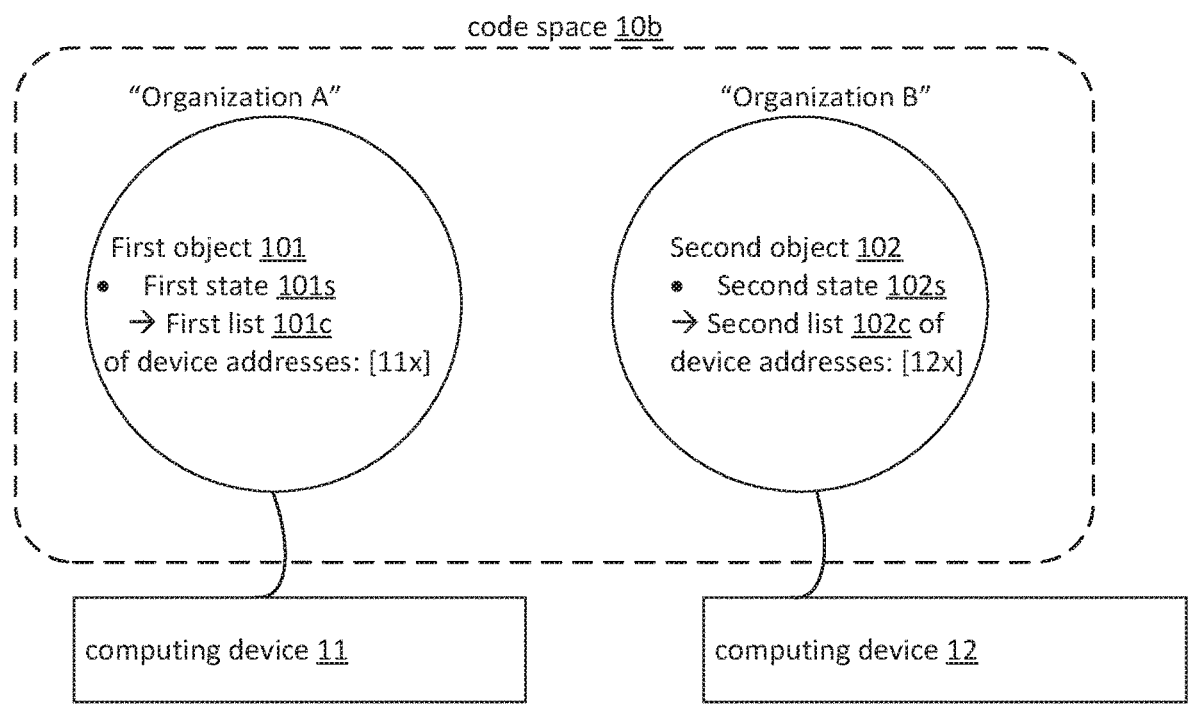

By way of non-limiting example, FIG. 3B illustrates an exemplary code space 10b interacting with one or more computing devices. Code space 10b may be similar to code space 10a in FIG. 3A, after the occurrence of certain events described herein. Subsequent to request 11a and request 11b in FIG. 3A, the code space may be similar to code space 10b in FIG. 3B. As depicted, code space 10b interacts with (first) computing device 11 and (second) computing device 12. In some implementations, first object 101 and/or first state 101s may be associated with and/or include a reference and/or other link to a particular computing device that has ownership privileges regarding first object 101, also referred to as the ownership device. As depicted in FIG. 3B, first computing device 11 is the ownership device of first object 101, and second computing device 12 is the ownership device of second object 102. Subsequent to completion of first request 11a and second request 12a (in FIG. 3a), first list 101c and second list 102c are no longer empty. As depicted in FIG. 3B, first list 101c includes first device address 11x and second list 102c includes second device address 12x.

State modification component 110 may be configured to store, on the decentralized database, sets of code executable by the decentralized database, including but not limited to a second set of code. The second set of code may define functions. The functions may be configured to receive requests from client computing platforms 104 (e.g., first computing device 11, second computing device 12, etc.). A request may be to modify a particular state of a particular object. A request may be to modify one or more states of one or more objects. A request may be to invoke a particular function defined in the second set of code. The functions may be configured to perform a validation, responsive to a particular request pertaining to a particular object, whether the device address of the requesting computing device is included in the permitted device list of the particular object. In some implementations, for at least some particular functions, the particular functions may be configured to perform a validation, responsive to a particular request pertaining to a particular object, whether the device address of the requesting computing device corresponds to the ownership device of the particular object. In other words, in some implementations, certain functions may require ownership privileges. The functions may be configured to modify, responsive to the device address of the requesting device validated (e.g., being included in the permitted device list), the state of the particular object in accordance with the particular request. The functions may be configured to maintain, responsive to the device address of the requesting device not being included in the permitted device list, the state of the particular object without modification by denying the particular request.

Figure 4A:
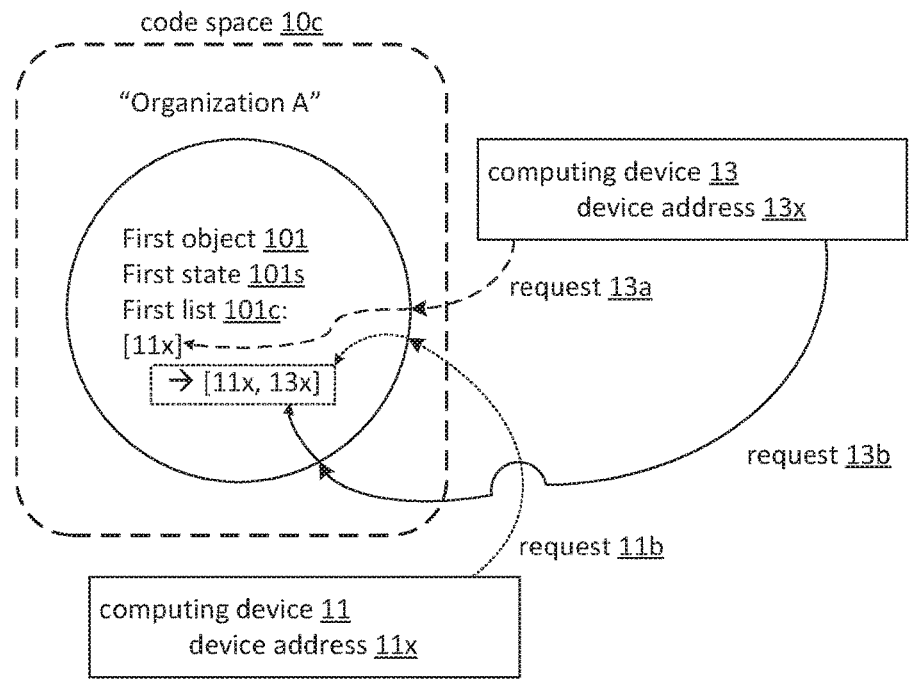

By way of non-limiting example, FIG. 4A illustrates an exemplary code space 10c interacting with one or more computing devices, in accordance with one or more implementations of system 100. As depicted, code space 10c interacts with (first) computing device 11 that is identified by (first) device address 11x and (third) computing device 13 that is identified by (third) device address 13x. Prior to any of the requests depicted in FIG. 4A, first list 101c of permitted devices include first device address 11x. First, a request 13a by computing device 13 is received by the functions that are defined by the second set of code as stored by state modification component 110. For example, request 13a may be to modify a status variable that is included in first state 101s, e.g., from "PHASE 1" to "PHASE 2". The functions may validate whether device address 13x is included in first list 101c. At the time of request 13a, first list 101c includes only device address 11x. Accordingly, request 13a is denied. Subsequently, a request 11b by computing device 11 is received by the functions. For example, request 11b may be to add device address 13x to first list 101c. The functions may validate whether device address 11x is currently included in first list 101c. At the time of request 11b, first list 101c includes device address 11x. Accordingly, request 11b is permitted, and first state 101s is modified in accordance with request 11b, such that first list 101c includes both device address 11x and device address 13x. Subsequently, a request 13b by computing device 13 is received by the functions. For example, request 13b may be to modify a status variable that is included in first state 101s, e.g., from "PHASE 1" to "PHASE 2". The functions may validate whether device address 13x is included in first list 101c. At the time of request 13b, first list 101c includes device address 11x and device address 13x. Accordingly, request 13b is permitted, such that the status variable is "PHASE 3".

Figure 4B:
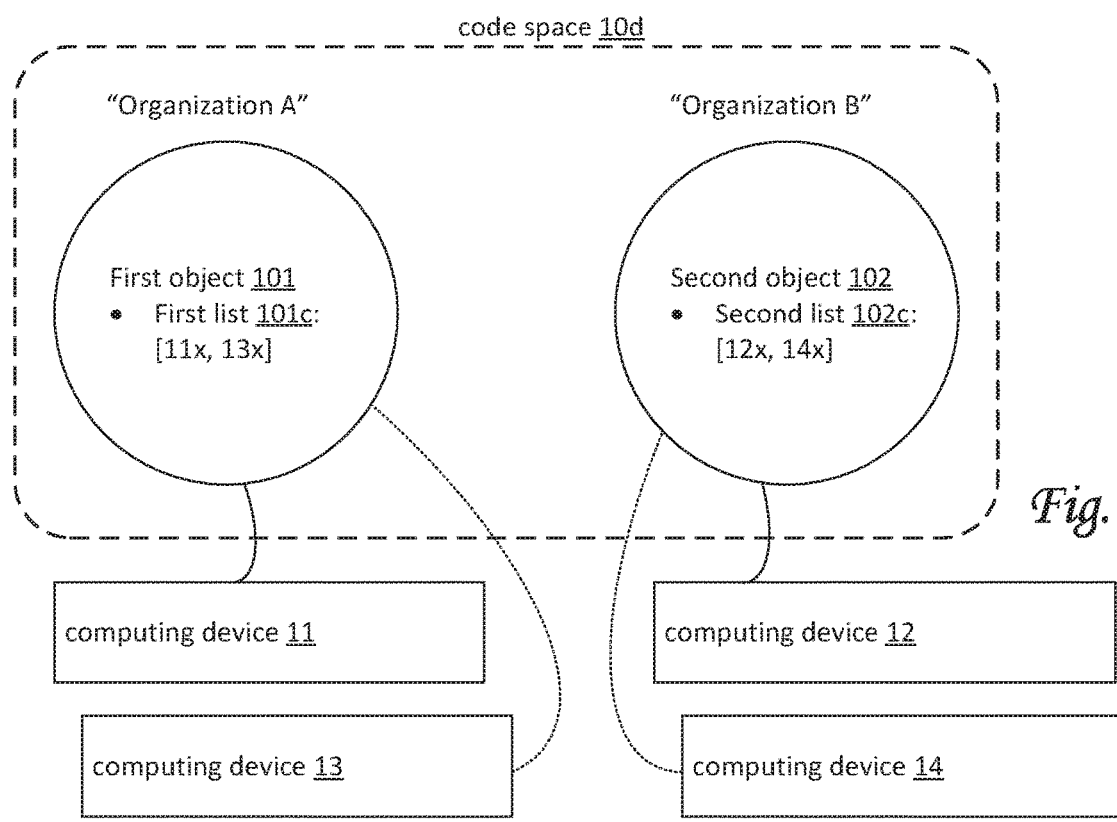

By way of non-limiting example, FIG. 4B illustrates an exemplary code space 10d interacting with one or more computing devices. Code space 10d may be similar to code space 10c in FIG. 4A, after the occurrence of certain events described herein. Subsequent to request 11b in FIG. 4A (and subsequent to a similar request from computing device 12 regarding device address 14x of computing device 14), the code space may be similar to code space 10d in FIG. 4B. As depicted, code space 10d interacts with computing device 11, computing device 12, third computing device 13 and fourth computing device 14. Computing device 11 is the ownership device of first object 101, and computing device 12 is the ownership device of second object 102. First list 101c includes first device address 11x and third device address 13*x*. Second list 102*c* includes second device address 12*x* and fourth device address 14*x*. The dotted line from computing device 13 to first object 101 may indicate that computing device 13 is included in the permitted devices list for first object 101. The dotted line from computing device 14 to second object 102 may indicate that computing device 14 is included in the permitted devices list for second object 102.

In some implementations, the first set of code configured to instantiate and/or deploy certain types of objects may be invoked by one or more client computing platforms 104 only if the requesting computing device is on the permitted device list for another type of object. Alternatively, and/or simultaneously, in some implementations, the first set of code configured to instantiate and/or deploy certain types of objects may be invoked by one or more client computing platforms 104 only if the requesting computing device is the ownership device for a particular object. For example in some implementations, to deploy an organization-controlled asset object, the requesting computing device may need to be on the permitted device list of a particular organization object. For example, in some implementations, to deploy an organization-controlled asset object, the requesting computing device may need to be the ownership device of a particular organization object. In some implementations, such restrictions may be required because an individual organization-controlled asset object may need to be under control and/or custody of at least one organization object.

Figure 5A:
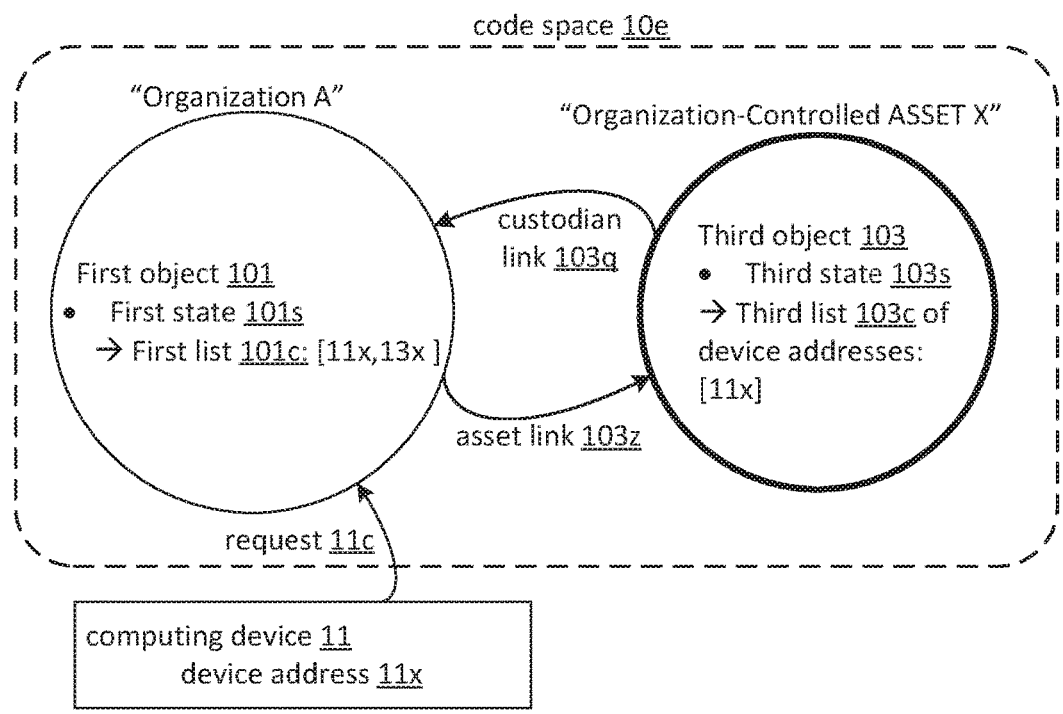

By way of non-limiting example, FIG. 5A illustrates an exemplary code space 10*e* interacting with computing device 11. Code space 10*e* may be similar to a portion of code space 10*d* in FIG. 4B, after the occurrence of certain events described herein. Computing device 11 may interact with code space 10*e* by a request 11*c* to instantiate and/or deploy an object, in particular an organization-controlled asset object. Request 11*c* may effectuate, through the executable code stored by object instantiation component 108, the instantiation and/or deployment of third object 103. Third object 103 may by identified by an object identifier, here depicted as a label "Organization-Controlled ASSET X". Third object 103 may have a third state 103*s* (e.g., an organization-controlled asset object state). Third state 103*s* may include different types of information, including but not limited to a third list 103*c* of device addresses of computing devices that are permitted to take certain actions affecting third object 103, such as modifying third state 103*s*, and/or other actions. In some implementations, third state 103*s* may include and/or refer to an object identifier for an instantiated organization object that has control and/or custody over third object 103, here depicted by a custodian link 103*q*. In some implementations, third state 103*s* may not need to include third list 103*c* if the functionality of the permitted device list relies on the permitted device list of the object linked by custodian link 103*q*, which is first list 101*c* in code space 10*e*. In some implementations, subsequent to completion of request 11*c*, first state 101*s* may be modified to include or refer to third object 103 here depicted by an asset link 101*z*. In some plementations, organization objects may have multiple asset links and/or a list of linked asset objects. In some implementations, asset objects may have multiple custodian links and/or different types of custodian for different purposes. For example, one or more particular organization objects and/or particular computing devices may be designated as one or more future custodians of a particular organization-controlled asset object. For example, in some examples, a future custodian may become the custodian after a predefined period and/or the occurrence of a predefined event within the code space.

Figure 5B:
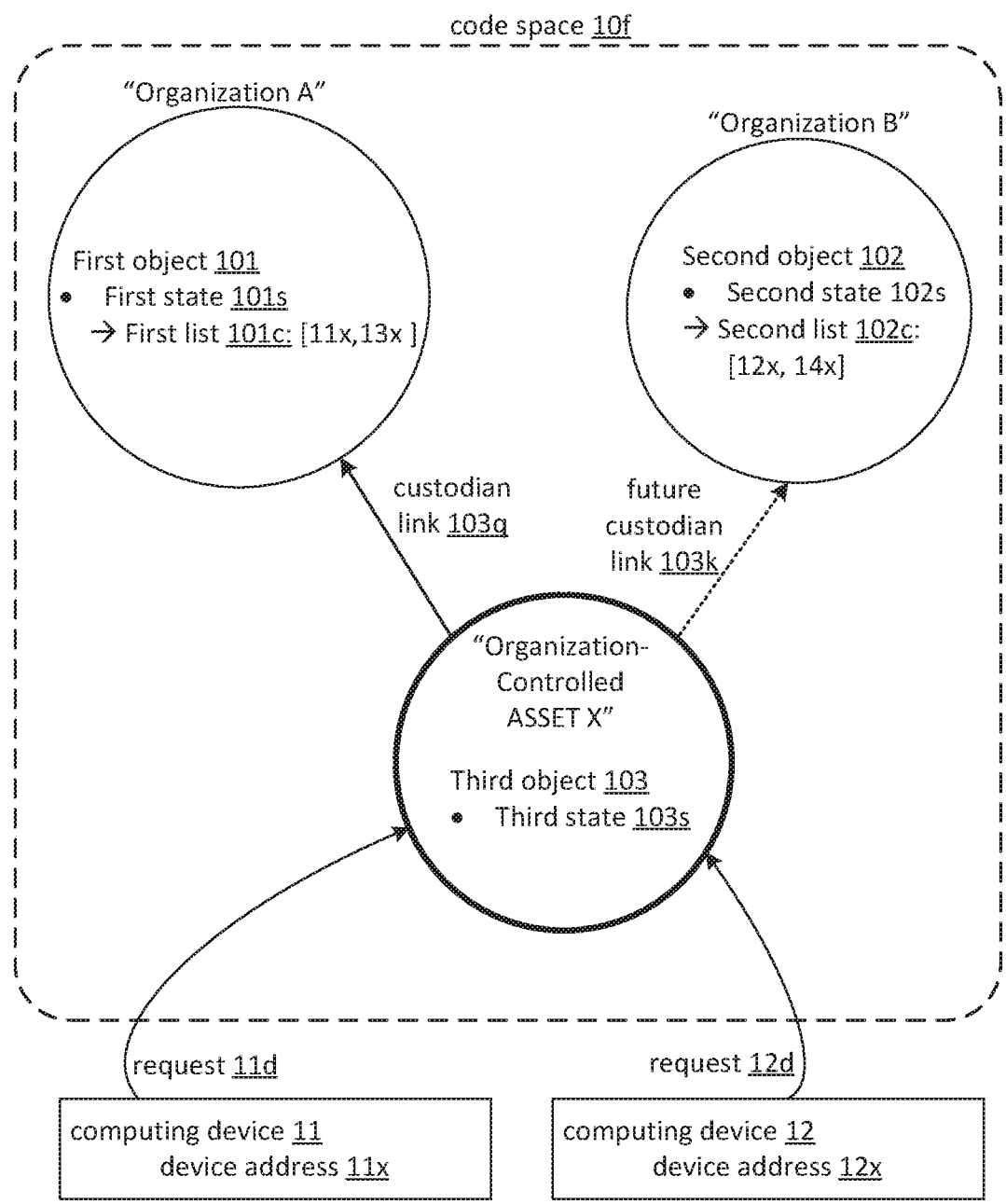

By way of non-limiting example, FIG. 5B illustrates an exemplary code space 10*f* interacting with one or more computing devices. Code space 10*f* may be similar to a combination of code space 10*d* in FIG. 4B and code space 10*e* in FIG. 5A, after the occurrence of certain events described herein. Subsequent to request 11*c* in FIG. 5A, code space 10*f* may include third object 103. As depicted, code space 10*f* interacts with computing device 11 and computing device 12. Prior to any of the requests depicted in FIG. 5B, custodian link 103*q* of third object 103 refers to first object 101, and no (organization) objects are referred by a future custodian link 103*k*. First, a request 11*d* by computing device 11 is received by the functions that are defined by the second set of code as stored by state modification component 110. For example, request 11*d* may be to modify future custodian link 103*k* that is included in third state 103*s*, e.g., to second object 102. The functions may validate whether device address 11*x* is included in the permitted device list referred to by custodian link 103*q*, which is first list 101*c*. At the time of request 11*d*, first list 101*c* includes device address 11*x* and device address 13*x*. Accordingly, request 11*d* is permitted, and future custodian link 103*k* is modified in accordance with request 11*d*, such that future custodian link 103*k* refers to second object 102. Subsequently, a request 12*d* by computing device 12 is received by the functions. For example, request 12*d* may be to modify a status variable that is included in third state 103*s*, e.g., from "PHASE 2" to "PHASE 3". The functions may validate whether device address 12*x* is currently included in the permitted device list referred to by either custodian link 103*q*, future custodian link 103*k*—which is second list 102*c*—or both. At the time of request 12*d*, second list 102*c* includes device address 12*x* and device address 14*x*. Accordingly, request 12*d* is permitted (through future custodian link 10*k*, and third state 103*s* is modified in accordance with request 12*d*, such that the status variable is "PHASE 3". In some implementations, second object 102 may take custody of third object 103 such that custodian link 103*q* is modified to refer to second object 102 instead of first object 101. At such a time, computing device 11 may no longer be able to modify state 103. In a preferred embodiment, at any moment a particular organization-controlled asset object gets a new custodian (e.g., when a designated future custodian becomes the current custodian), the list of next/future permitted custodian(s)—e.g., organization object(s)—may reset to a list containing only the new custodian.

Referring to FIG. 1, in some implementations, requests from client computing platforms 104 may be received through one or more external applications 105 that may be external to and separate and/or distinct from database 113, a blockchain included in and/or implemented by database 113, a distributed computing platform maintained by a blockchain, a runtime environment for smart contracts and other applications on a blockchain, and/or a code space. In some implementations, external applications 105 may include a user authentication application. In some implementations, the user authentication application may be executed on client computing platforms 104. In some implementations, individual users associated with individual client computing platforms 104 may be required to provide individual passwords to use the user authentication application. In some implementations, the user authentication application may be configured to effectuate that requests are digitally signed and/or include a digital signature, so that requests may be authenticated. In some implementations, one or more functions as discussed herein in relation to FIGS. 3A-3B-4A-4B-5A-5B may be invoked through one or more external applications 105. For example, in some plementations, modifications of states of objects may be responsive to a validation that a request is authentic, e.g. based on digital signatures. For example, a particular user of a particular computing device having a particular device address may wish for the particular computing device to be added to the list for permitted devices for an organization object, e.g., organization object "C". The particular user may send a device permission request through the user authentication application. The user authentication application may maintain mappings between users, devices, and/or objects, including but not limited to a mapping between organization objects and their associated ownership devices. Such a mapping may facilitate routing messages, including but not limited to device permission requests. In particular, this mapping may facilitate routing the device permission request to the ownership device for organization object "C". The user/owner associated with this ownership device may use a mapping between users, devices, and/or device addresses (this mapping also being maintained by the user authentication application) to determine whether the particular user (mapped to the particular computing device having the particular device address) should be granted permission as requested (which will modify the list for permitted devices for organization object "C"), or not. Similarly, other functions described herein including but not limited to functions to grant permissions and/or custody regarding organization-controlled asset objects, may be implemented through the user authentication application. Regarding these mappings, note that different computing devices (having different device addresses) may be mapped to the same user.

In some implementations, one or more functions described herein may be performed by an instruction component. For example, request receipt component 111a may be configured to receive requests from client computing platforms 104 (e.g., first computing device 11, second computing device 12, etc.). A request may be to modify a particular state of a particular object. A request may be to modify one or more states of one or more objects. A request may be to invoke a particular function defined in the second set of code. For example, permission validation component 111b may be configured to perform validations, e.g., responsive to a particular request pertaining to a particular object. In some implementations, permission validation component 111b may be configured to validate whether the device address of a requesting computing device is included in the permitted device list of a particular object.)

In some implementations, server(s) 102, client computing platform(s) 104, and/or external resources 112 may be operatively linked via one or more electronic communication links. For example, such electronic communication links may be established, at least in part, via one or more network 13 such as, e.g., the Internet and/or other networks. It will be appreciated that this is not intended to be limiting, and that the scope of this disclosure includes implementations in which server(s) 102, client computing platform(s) 104, and/or external resources 112 may be operatively linked via some other communication media.

A given client computing platform 104 may include one or more processors configured to execute computer program components. The computer program components may be configured to enable an expert or user associated with the given client computing platform 104 to interface with system 100 and/or external resources 112, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a computing device, and/or other computing platforms.

External resources 112 may include sources of information outside of system 100, external entities participating with system 100, external applications and/or other resources. In some implementations, some or all of the functionality attributed herein to external resources 112 may be provided by resources included in system 100.

Server(s) 102 may include electronic storage 114, one or more processors 116, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 114 may comprise non-transitory storage media that electronically stores information. The electronic storage media of electronic storage 114 may include one or both of system storage that is provided integrally (i.e., substantially non-removable) with server(s) 102 and/or removable storage that is removably connectable to server(s) 102 via, for example, a port (e.g., a USB port a fire wire port, etc.) or a drive (e.g., a disk drive, etc.). Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 114 may include one or more virtual storage resources (e.g., cloud storage, a virtual private network, and/or other virtual storage resources). Electronic storage 114 may store software algorithms, information determined by processor(s) 116, information received from server(s) 102, information received from client computing platform(s) 104, and/or other information that enables server(s) 102 to function as described herein.

Processor(s) 116 may be configured to provide information processing capabilities in server(s) 102. As such, processor(s) 116 may include one or more of a digital processor, an analog processor, a digital circuit designed to process information, an analog circuit designed to process information, a state machine, and/or other mechanisms for electronically processing information. Although processor(s) 116 is shown in FIG. 1 as a single entity, this is for illustrative purposes only. In some implementations, processor(s) 116 may include a plurality of processing units. These processing units may be physically located within the same device, or processor(s) 116 may represent processing functionality of a plurality of devices operating in coordination. Processor(s) 116 may be configured to execute components 108 and/or 110, and/or other components. Processor(s) 116 may be configured to execute components 108 and/or 110, and/or other components by software; hardware; firmware; some combination of software, hardware, and/or firmware; and/or other mechanisms for configuring processing capabilities on processor(s) 116. As used herein, the term "component" may refer to any component or set of components that perform the functionality attributed to the component. This may include one or more physical processors during execution of processor readable instructions, the processor readable instructions, circuitry, hardware, storage media, or any other components.)

It should be appreciated that although components 108 and/or 110 are illustrated in FIG. 1 as being implemented within a single processing unit, in implementations in which processor(s) 116 includes multiple processing units, one or more of components 108 and/or 110 may be implemented remotely from the other components. The description of the functionality provided by the different components 108 and/or 110 described below is for illustrative purposes, and is not intended to be limiting, as any of components 108 and/or 110 may provide more or less functionality than is described. For example one or more of components 108 and/or 110 may be eliminated, and some or all of its functionality may be provided by other ones of components 108 and/or 110. As another example processor(s) 116 may be configured to execute one or more additional components that may perform some or all of the functionality attributed below to one of components 108 and/or 110.

Figure 2:
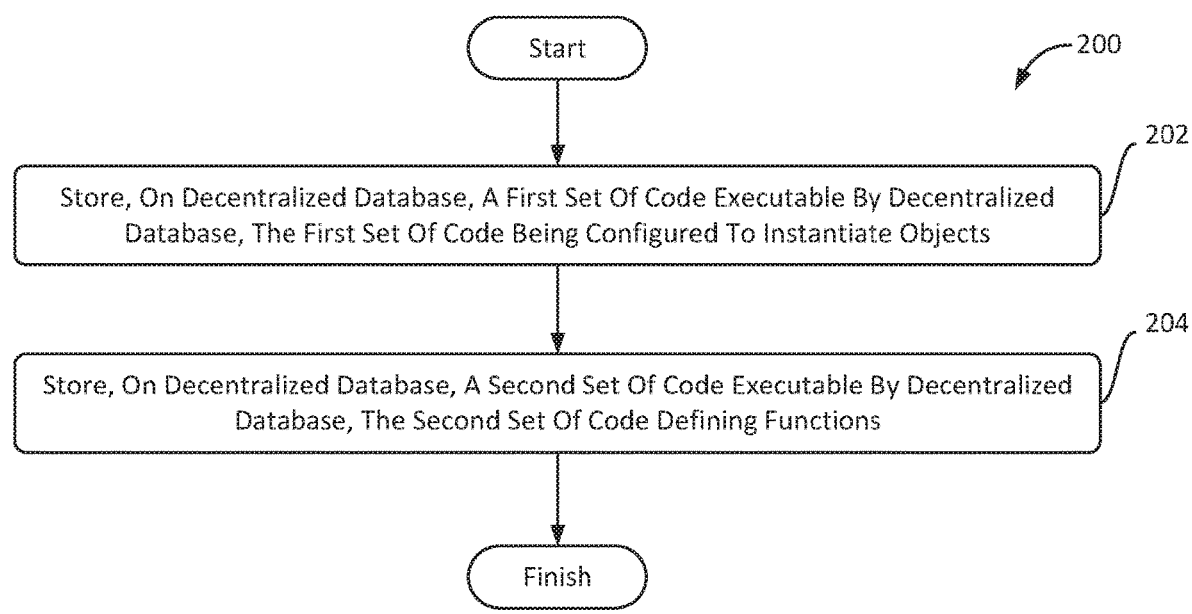
FIG. 2 illustrates a method for validating device permissions of computing devices to execute code on a decentralized database, in accordance with one or more implementations.

FIG. 2 illustrates a method 200 for validating device permissions of computing devices to execute code on a decentralized database, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, on a decentralized database, a first set of code executable by the decentralized database. The first set of code may be configured to instantiate a first object having a first state and a second object having a second state. The first state may include a first list of device addresses of computing devices that are permitted to request modification of the first state. The second state may include a second list of device addresses of computing devices that are permitted to request modification of the second state. Operation 202 may be performed by one or more hardware processors configured by machine-readable instructions including a component that is the same as or similar to object instantiation component 108, in accordance with one or more implementations.

An operation 204 may include storing, on the decentralized database, a second set of code executable by the decentralized database. The second set of code may define functions. In some implementations, the functions implement receiving requests from computing devices, validating whether the requesting computing devices are permitted to make the requests, modifying the state of instantiated objects in accordance with the received requests, and/or other functions. Operation 204 may be performed by one or more hardware processors configured by machine-readable instructions including a component that is the same as or similar to state modification component 110, in accordance with one or more implementations. In some implementations, execution of the functions defined by the second set of code may be performed by one or more hardware processors configured by machine-readable instructions including a component that is the same as or similar to one or more of state modification component 110, request receipt component 111a, permission validation component 111b, and/or other components, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for validating device permissions of computing devices to execute code on a decentralized database, the system comprising:
one or more hardware processors configured by machine-readable instructions to:
store, on the decentralized database, a first set of code executable by the decentralized database, wherein the first set of code is configured to instantiate a first object having a first state and a second object having a second state, wherein the first state includes a first list of device addresses of computing devices that are permitted to request modification of the first state, wherein the second state includes a second list of device addresses of computing devices that are permitted to request modification of the second state;
store, on the decentralized database, a second set of code executable by the decentralized database, the second set of code defining functions, wherein the functions are configured to:
receive a first request from a first computing device to modify the first state, wherein the first computing device is identified by a first device address, wherein the first request is received through an application that is being executed on the first computing device, wherein the application interacts with the second set of code, wherein the application is configured to generate a digital signature for the first request;
perform a validation, responsive to receipt of the first request, whether the first request is authentic, wherein the validation is based on an analysis of the digital signature;
responsive to the first request, validate whether the first device address is included in the first list;
responsive to the first device address being included in the first list and further responsive to the validation that the first request is authentic, modify the first state in accordance with the first request;

receive a second request from a second computing device to modify the second state, wherein the second computing device is identified by a second device address;

responsive to the second request, validate whether the second device address is included in the second list; and responsive to the second device address not being included in the second list, maintain the second state without modification by denying the second request.

2. The system of claim 1, wherein validating whether the first device address is included in the first list is based on the analysis of the digital signature.

3. The system of claim 1, wherein the one or more hardware processors are further configured by machine-readable instructions to:

store, on the decentralized database, an additional set of code executable by the decentralized database, wherein the additional set of code is configured to instantiate a third object having a third state, wherein the third state includes a third list of device addresses of computing devices that are permitted to request modification of the third state;

wherein the functions defined by the second set of code are further configured to:

receive a third request from the first computing device to modify the third state;

responsive to the third request, validate whether the first device address is included in the third list;

responsive to the first device address being included in the third list, modify the third state in accordance with the third request;

receive a fourth request from the second computing device to modify the third state;

responsive to the fourth request, validate whether the second device address is included in the third list; and responsive to the second device address not being included in the third list, maintain the third state without modification by denying the fourth request.

4. The system of claim 3, wherein the functions are further configured to:

receive a fifth request from the first computing device to modify the third state by including the second device address in the third list of device addresses;

responsive to the fifth request, validate whether the first device address is included in the third list;

responsive to the first device address being included in the third list, modify the third state by including the second device address in the third list of device addresses;

subsequent to receipt of the fifth request, receive a sixth request from the second computing device to modify the third state;

responsive to the sixth request, validate whether the second device address is included in the third list; and responsive to the second device address being included in the third list as a result of the fifth request, modify the third state in accordance with the sixth request.

5. The system of claim 1, wherein the functions are further configured to:

receive a seventh request from the first computing device to modify the first state by including the second device address in the first list of device addresses;

responsive to the seventh request, validate whether the first device address is included in the first list;

responsive to the first device address being included in the first list, modify the first state by including the second device address in the first list of device addresses;

subsequent to receipt of the seventh request, receive an eighth request from the second computing device to modify the first state;

responsive to the eighth request, validate whether the second device address is included in the first list; and responsive to the second device address being included in the first list as a result of the seventh request, modify the first state in accordance with the eighth request.

6. The system of claim 1, wherein the computing devices further include a third computing device identified by a third device address;

wherein the functions are further configured to:

receive a ninth request from the third computing device to modify the first state;

responsive to the ninth request, validate whether the third device address is included in the first list;

responsive to the third device address not being included in the first list, maintain the first state without modification by denying the ninth request;

subsequent to receipt of the ninth request, receive a tenth request from the first computing device to modify the first state by including the third device address in the first list of device addresses;

responsive to the tenth request, validate whether the first device address is included in the first list;

responsive to the first device address being included in the first list, modify the first state in accordance with the tenth request;

receive an eleventh request from the third computing device to modify the first state;

responsive to the eleventh request, validate whether the third device address is included in the first list; and responsive to the third device address being included in the first list as a result of the tenth request, modify the first state in accordance with the eleventh request.

7. The system of claim 1, wherein the first request is to:

modify the first state by instantiating a fourth object having a fourth state, wherein the fourth object includes a reference to a list of device addresses of computing devices that are permitted to request modification of the fourth state, wherein the reference refers to the first list, grant the first object custody of the fourth object, and include a reference to the fourth object in the first state.

8. The system of claim 7, wherein the functions are further configured to:

receive a twelfth request from the first computing device to modify the fourth state by granting the second object future custody of the fourth object;

responsive to the twelfth request, validate whether the first device address is included in the first list; and responsive to the first device address being included in the first list, modify the fourth state in accordance with the twelfth request, thereby modifying the reference to include and/or refer to the second list.

9. The system of claim 8, wherein the functions are further configured to:

receive a thirteenth request from the second computing device to modify the fourth state;

responsive to the thirteenth request, validate whether the second device address is included in and/or referenced by the reference; and responsive to the second device address being included in and/or referenced by the reference, modify the fourth state in accordance with the thirteenth request.

10. A method for validating device permissions of computing devices to execute code on a decentralized database, the method comprising:
storing, on the decentralized database, a first set of code executable by the decentralized database, wherein the first set of code is configured to instantiate a first object having a first state and a second object having a second state, wherein the first state includes a first list of device addresses of computing devices that are permitted to request modification of the first state, wherein the second state includes a second list of device addresses of computing devices that are permitted to request modification of the second state;
storing, on the decentralized database, a second set of code executable by the decentralized database, the second set of code defining functions, wherein the functions are configured to:
receive a first request from a first computing device to modify the first state, wherein the first computing device is identified by a first device address, wherein the first request is received through an application that is being executed on the first computing device, wherein the application interacts with the second set of code, wherein the application generates a digital signature for the first request;
perform a validation, responsive to receipt of the first request, whether the first request is authentic, wherein the validation is based on an analysis of the digital signature;
responsive to the first request, validate whether the first device address is included in the first list;
responsive to the first device address being included in the first list and further responsive to the validation that the first request is authentic, modify the first state in accordance with the first request;
receive a second request from a second computing device to modify the second state, wherein the second computing device is identified by a second device address;
responsive to the second request, validate whether the second device address is included in the second list; and
responsive to the second device address not being included in the second list, maintain the second state without modification by denying the second request.

11. The method of claim 10, wherein validating whether the first device address is included in the first list is based on the analysis of the digital signature.

12. The method of claim 10, further comprising:
storing, on the decentralized database, an additional set of code executable by the decentralized database, wherein the additional set of code is configured to instantiate a third object having a third state, wherein the third state includes a third list of device addresses of computing devices that are permitted to request modification of the third state;
wherein the functions defined by the second set of code are further configured to:
receive a third request from the first computing device to modify the third state;
responsive to the third request, validate whether the first device address is included in the third list;
responsive to the first device address being included in the third list, modify the third state in accordance with the third request;
receive a fourth request from the second computing device to modify the third state;
responsive to the fourth request, validate whether the second device address is included in the third list; and
responsive to the second device address not being included in the third list, maintain the third state without modification by denying the fourth request.

13. The method of claim 12, wherein the functions are further configured to:
receive a fifth request from the first computing device to modify the third state by including the second device address in the third list of device addresses;
responsive to the fifth request, validate whether the first device address is included in the third list;
responsive to the first device address being included in the third list, modify the third state by including the second device address in the third list of device addresses;
subsequent to receipt of the fifth request, receive a sixth request from the second computing device to modify the third state;
responsive to the sixth request, validate whether the second device address is included in the third list; and
responsive to the second device address being included in the third list as a result of the fifth request, modify the third state in accordance with the sixth request.

14. The method of claim 10, wherein the functions are further configured to:
receive a seventh request from the first computing device to modify the first state by including the second device address in the first list of device addresses;
responsive to the seventh request, validate whether the first device address is included in the first list;
responsive to the first device address being included in the first list, modify the first state by including the second device address in the first list of device addresses;
subsequent to receipt of the seventh request, receive an eighth request from the second computing device to modify the first state;
responsive to the eighth request, validate whether the second device address is included in the first list; and
responsive to the second device address being included in the first list as a result of the seventh request, modify the first state in accordance with the eighth request.

15. The method of claim 10, wherein the computing devices further include a third computing device identified by a third device address;
wherein the functions are further configured to:
receive a ninth request from the third computing device to modify the first state;
responsive to the ninth request, validate whether the third device address is included in the first list;
responsive to the third device address not being included in the first list, maintain the first state without modification by denying the ninth request;
subsequent to receipt of the ninth request, receive a tenth request from the first computing device to modify the first state by including the third device address in the first list of device addresses;
responsive to the tenth request, validate whether the first device address is included in the first list;
responsive to the first device address being included in the first list, modify the first state in accordance with the tenth request;
receive an eleventh request from the third computing device to modify the first state;
responsive to the eleventh request, validate whether the third device address is included in the first list; and responsive to the third device address being included in the first list as a result of the tenth request, modify the first state in accordance with the eleventh request.

16. The method of claim 10, wherein the first request is to:

modify the first state by instantiating a fourth object having a fourth state, wherein the fourth object includes a fourth list of device addresses of computing devices that are permitted to request modification of the fourth state, grant the first object custody of the fourth object, and include and/or reference the fourth object in the first state.

17. The method of claim 16, wherein the functions are further configured to:

receive a twelfth request from the first computing device to modify the fourth state by granting the second object future custody of the fourth object;

responsive to the twelfth request, validate whether the first device address is included in the first list; and responsive to the first device address being included in the first list, modify the fourth state in accordance with the twelfth request, thereby granting the second object custody of the fourth object.

18. The method of claim 17, wherein the functions are further configured to:

receive a thirteenth request from the second computing device to modify the fourth state;

responsive to the thirteenth request, validate whether the second device address is included in the second list; and responsive to the second device address being included in the second list, modify the fourth state in accordance with the thirteenth request.

\* \* \* \* \*